Dec. 7, 1965 L. R. DOWNING, JR., ETAL 3,221,466
DUAL PURPOSE INTERLOCKING BEAM CONNECTORS
Filed Feb. 13, 1964 2 Sheets-Sheet 1
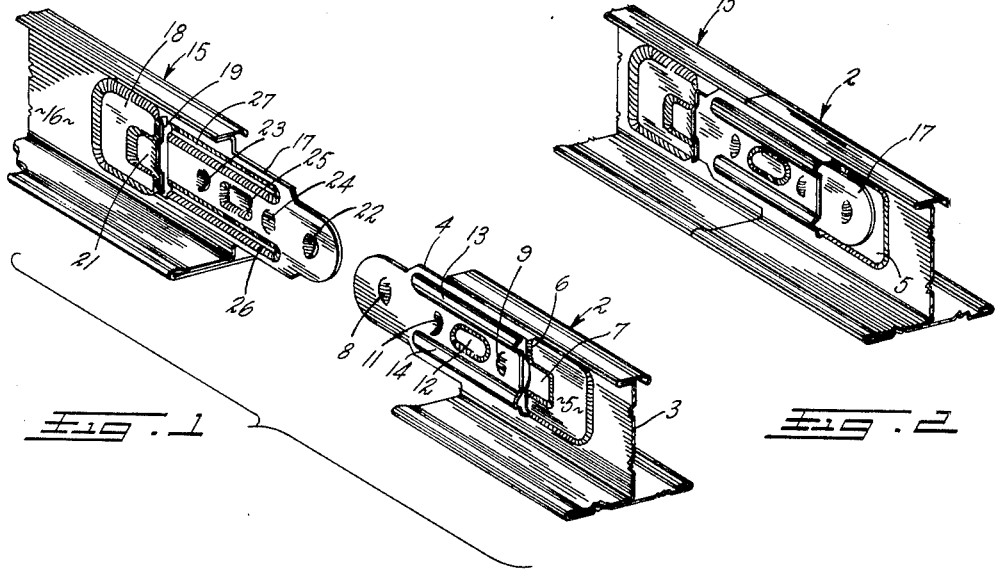
Fig. 1
Fig. 2
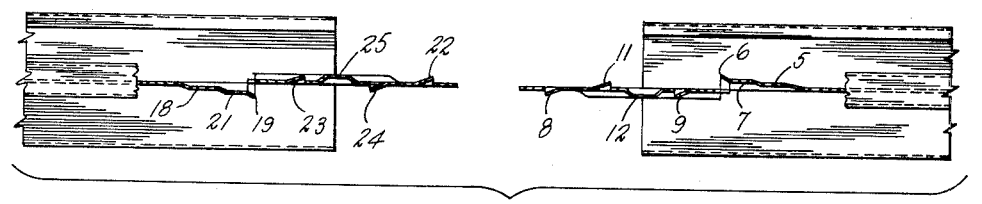
Fig. 4
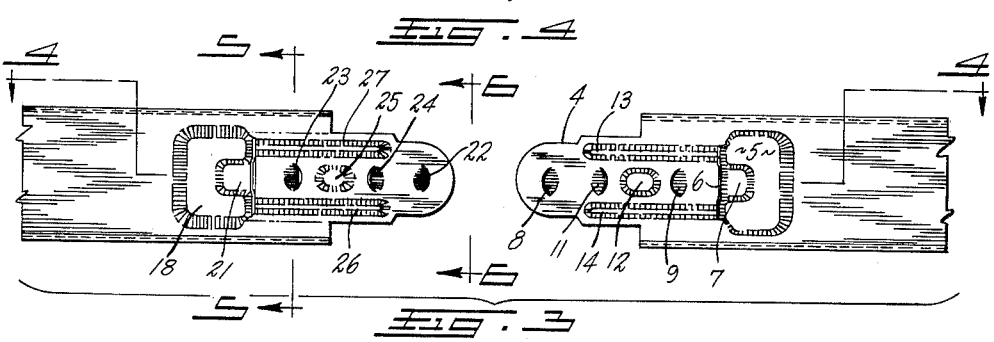
Fig. 3
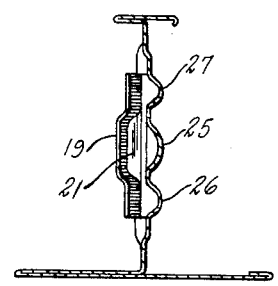
Fig. 5
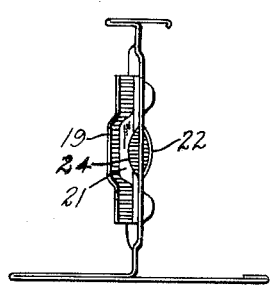
Fig. 6
INVENTORS.
DONALD A. BROWN
LUCIEN R. DOWNING, JR.
BY
*Schramm, Kramer & Stenger*
attorneys Dec. 7, 1965  L. R. DOWNING, JR., ETAL  3,221,466
DUAL PURPOSE INTERLOCKING BEAM CONNECTORS
Filed Feb. 13, 1964  2 Sheets-Sheet 2
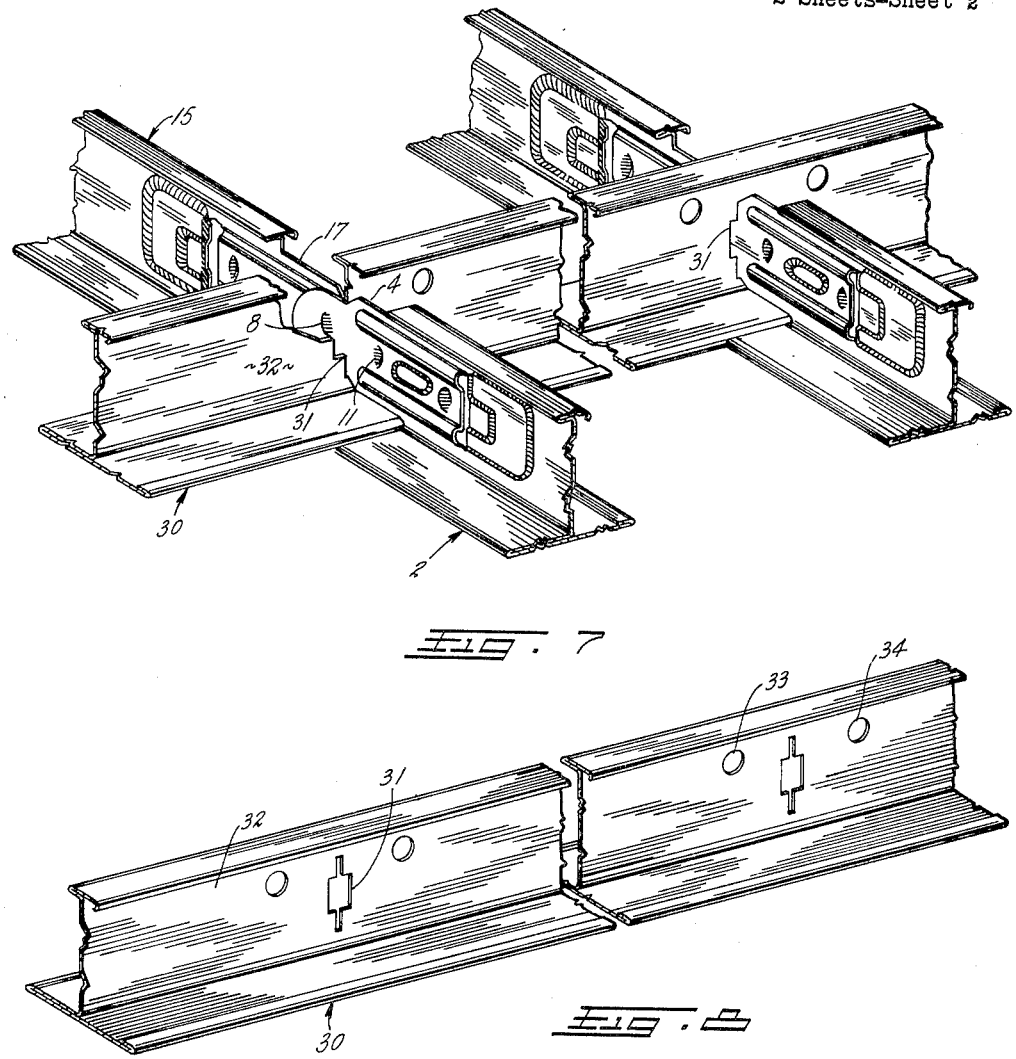
INVENTORS.
DONALD A. BROWN
LUCIEN R. DOWNING, JR.
BY
*Schramm, Kramer & Sturges*
attorneys

United States Patent Office 3,221,466
Patented Dec. 7, 1965

3,221,466
DUAL PURPOSE INTERLOCKING
BEAM CONNECTORS
Lucien R. Downing, Jr., Avon Lake, and Donald A. Brown, Westlake, Ohio, assignors to Donn Products, Inc., a corporation of Ohio
Filed Feb. 13, 1964, Ser. No. 344,775
6 Claims. (Cl. 52—726)

This invention relates to interlocking beam connectors and more particularly to dual purpose interlocking beam connectors for structural beams having planar web portions. The connectors are used to connect beams in end-to-end relation and to connect beams to a supporting beam member.

In providing for interlocking connections between beams disposed in end-to-end relation, a principal problem has been the development of suitable rigidity of the beam at the joint. This problem is compounded when it is desired to provide an interlocking connection for beams in end-to-end relation which may also be disconnected. While structures have been made which are readily disconnected, ready disconnectability is achieved at the sacrifice of rigidity and stability during assembly. Ready disconnectability permits parts to become disconnected during assembly on handling of adjacent parts. Disconnectability is a desirable objective, from the standpoint of replacement of damaged parts or subsequent assembly of additional units, e.g. ceiling fluorescent lights. The structures of the present invention provide a rigid interlocking connection which is difficultly disconnectable so that the parts will remain interlocked during assembly, but are nevertheless disconnectable with difficulty, and involve deformation of metal parts usually beyond the elastic limit of the metal to enable replacement of such parts when and if such might become necessary.

Briefly stated the invention consists of a dual purpose integral connector for opposing structural beams connected in end-to-end relationship, and for pairs of cross beams disposed in confronting interlocking relationship to each other and intersecting relationship with a main supporting beam. The structural beams have planar web portions defined by spaced marginal edges, preferably parallel marginal edges. The connector includes a tongue portion extending beyond the extremity of the web portion and integral therewith. Said tongue portion lies substantially in a plane displaced from, and parallel to, the plane of said web. A plurality of detent receiving recesses and a detent are disposed on the tongue portions in spaced relation, for interlocking coaction. Adjacent the proximal extremity of said tongue portion is a tongue deflecting cam struck out of the plane of said web in a direction, which guides and forces the tongue portions into an overlapping relation when said beams are in end-to-end relationship. As the beams are brought together in end-to-end relation, the detents on said tongues are forced into interlocking relation with a first pair corresponding detent receiving recesses on said tongues. The slotted web portion of a main supporting beam guides and forces said tongue portions of said cross beams into overlapping relation when said beams are disposed in intersecting relation with said main beam. As the cross beams are further forced through the said slotted web, the detents on said tongues are forced into interlocking coaction with a second pair of corresponding detent receiving recesses.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

FIG. 1 is an isometric drawing of two confronting beams and their beam connectors.

FIG. 2 is an isometric drawing of two beams interlocked in an end-to-end relation.

FIG. 3 is a side view of two confronting beams and their connectors.

FIG. 4 is a cross-sectional view of the beam and the connector taken in the plane indicated by the line 4—4 of FIG. 3.

FIG. 5 is a cross-sectional view of the beam and the connector taken in the plane indicated by the line 5—5 of FIG. 3.

FIG. 6 is an end view of the beam and connector as seen from the plane indicated by the line 6—6 of FIG. 3.

FIG. 7 is an isometric drawing showing two pairs of beams connected to a third supporting beam.

FIG. 8 is an isometric drawing of a main supporting beam member showing the slotted web portion.

Referring more particularly to the embodiment of the invention shown in FIG. 1, a beam 2 having a planar web portion 3, has a tongue portion 4 extending beyond the extremity of flange portion 3. Tongue portion 4 lies substantially in a plane superior to, and parallel to the plane of web portion 3. At the proximal extremity of tongue portion 4 is tongue receiving pocket 5 which lies substantially in a plane inferior to and parallel to the plane of web portion 3. The cam portion 6 of tongue receiving pocket 5 is struck out of the plane of the tongue receiving pocket 5 in a direction inferior to the plane of tongue pocket 5 and defines a tongue deflecting and guiding cam adapted to deflect the distal extremity of a mating tongue portion and guide it through web portion 3. Located on the cam portion 6 is a tab passing relief 7. The reason for designating this as a cab passing relief is that in punching the detent receiving recess from one side of the tongue a protruding piece of metal, or tab, is formed on the other side of said tongue. A tab passing relief is necessary to permit the tongue portions to slide into interlocking coaction. Tab passing relief 7 lies substantially in a plane inferior to, and parallel to the plane of tongue receiving pocket 5. Adjacent the distal extremity of the tongue portion 4 is the first detent receiving recess 8 which is struck out of the plane of tongue portion 4 in a direction superior to the plane of tongue portion 4. Second detent receiving recess 9 adjacent the proximal extremity of tongue portion 4 is similar to recess 8 and similarly struck out of the tongue portion 4. Detent 11, located between recesses 8 and 9 in tongue portion 4, and in spaced relation thereto, is struck out of the plane of tongue portion 4 in a direction inferior to the plane of tongue portion 4. Recesses 8 and 9 are struck in a direction away from the proximal extremity of tongue portion 4 while detent 11 is struck in a direction towards the proximal extremity of tongue portion 4. A welt 12 located in the tongue portion 4 between recess 9 and detent 11 lies substantially in a plane superior to and parallel to the plane of tongue portion 4. Located near the top and bottom marginal edges of tongue portion 4, and extending from its proximal extremity to a point beyond detent 11, but short of recess 8 are tongue reinforcing ribs 13 and 14 struck out of the plane of tongue portion 4 in a direction superior to the plane of tongue portion 4.

Beam 15, having a configuration similar to that of beam 2, has extending from the extremity of its web portion 16, tongue portion 17, which lies substantially in a plane inferior to, and parallel to the plane of web portion 16. At the proximal extremity of tongue portion 17 is tongue receiving pocket 18, which lies substantially in a plane superior to, and parallel to the plane of web portion 16. The cam portion 19 of the tongue receiving pocket 18 is struck out of the plane of the tongue receiving pocket 18 in a direction superior to the plane of tongue receiving pocket 18 and defines a tongue deflecting and guiding cam adapted to deflect the distal extremity of a mating tongue portion, and guide it through web 16. Located on the cam portion 19 is tab passing relief 21, which lies substantially in a plane superior to, and parallel to the plane of tongue receiving pocket 18. Adjacent the distal extremity of tongue portion 17 is the first detent receiving recess 21, which is struck out of the tongue portion 17 in a direction inferior to the plane of tongue portion 17. Adjacent the proximal edge of tongue portion 17 is the second detent receiving recess 23, which is similarly struck out of the plane of tongue portion 17 in a direction inferior to the plane of tongue portion 17. Detent 24 located between recesses 22 and 23, and in spaced relation thereto, is struck out of the plane of tongue portion 17 in a direction superior to the plane of tongue portion 17. Recesses 22 and 23 are struck in a direction away from the proximal extremity of tongue portion 17 while detent 24 is struck in a direction towards the proximal extremity of tongue portion 17. Welt 25, located between recess 23 and detent 24 in tongue portion 17, lies substantially in a plane inferior to, and parallel to the plane of tongue portion 17. Located near the top and bottom marginal edges of tongue portion 17, and extending from its proximal extremity beyond detent 24 but short of recess 22 are tongue reinforcing ribs 26 and 27, which are struck out of the tongue portion 17 in a direction inferior to the plane of tongue portion 17. As seen in FIG. 1, tongue portions 4 and 17 as well as the tongue receiving pockets 5 and 18 have the same configurations but are oppositely disposed when in confronting relation.

When beams 2 and 15 are brought into interlocking end-to-end relation as shown in FIG. 2 the distal portion of tongue portion 17 of beam 15 lies in the tongue receiving pocket 5 of beam 2, and recess 23 and detent 24 of beam 15 interlock with detent 11 and recess 9, respectively, of beam 2. FIGS. 3, 4, 5 and 6 show more clearly the configuration of the tongue and pocket portions, their planes and the planes of the recesses and detents in relation to the plane of the web portion.

When beams 2 and 15 are interlocked with a third supporting beam 30 as shown in FIG. 7, the distal portions of tongue portions 4 and 17 are brought into interlocking relation through slot 31, FIGS. 7 and 8, in the web portion 32 of the supporting beam 30. As the tongue portions are forced through the slot 31, recess 22 and detent 24 of beam 15 become interlocked with detent 11 and recess 8 of beam 2. The configuration of the distal portion of the tongue portions is such as to facilitate interlocking the beams with a supporting beam member. The width of the distal tongue portion is such as to minimize the height of the slot in the web portion of the supporting beam. In this way the bending strength of the supporting beam is not impaired while the interlocking action of beams 2 and 15 is not reduced. Holes 33 and 34, located in the web portion 32 adjacent the upper flange of the supporting beam 30 as shown in FIG. 8, are used to fasten supporting ties.

The invention is described in relation with a beam having bilaterally extending flange portions. It is not meant to limit the invention thereof, as the invention can be used with beams having monolaterally extending flanges, beaded flanges, or any combination thereof. The invention is readily adapted to beams having planar web portions with any type flange configurations. The connection of the above type is especially desirous where beams are used for dropped luminous or acoustic tile ceilings.

Other modes of applying the principle of this invention may be employed instead of those specifically set forth above, changes being made as regards the details herein disclosed provided the elements set forth in any of the following claims, or the equivalent of such be employed.

It is, therefore, particularly pointed out and distinctly claimed as the invention:

1. A dual purpose integral connector for a structural beam, said beam including a web portion defining spaced marginal edges, said connector including a tongue portion extending beyond the extremity of the web portion and integral therewith, and lying substantially in a plane displaced from, and parallel to the plane of said web, said tongue portion having at its proximal and distal extremities detent receiving recesses, and having intermediate said recesses and, in spaced relation thereto, a detent adapted to interlockingly coact with a detent receiving recess of a corresponding tongue of another beam when the webs of said beams are disposed in end-to-end relation, and means disposed at the proximal extremity of said tongue portion for coacting with said corresponding tongue of said another beam for holding said tongues overlapped and in interlocked relation.

2. A dual purpose integral connector for a structural beam, said beam including a web portion defining spaced marginal edges, said connector including a tongue portion extending beyond the extremity of the web portion and integral therewith, and lying substantially in a plane displaced from, and parallel to a plane of said web, said tongue portion having at its proximal and distal extremities detent receiving recesses, and having intermediate said recesses and in spaced relation thereto, a detent adapted to interlockingly coact with a detent receiving recess of a corresponding tongue of another beam when the webs of said beams are disposed in end-to-end relation, and a cam portion struck out of the plane of said web adjacent the proximal extremity of said tongue portion for deflecting and guiding said corresponding tongue of said another beam through its web portion and into overlapping interlocking relation with its tongue portion.

3. A dual purpose integral connector for a structural beam, said beam including a web portion defining spaced marginal edges, said connector including a tongue portion extending beyond the extremity of the web portion and integral therewith, and lying substantially in a plane displaced from, and parallel to the plane of said web, said tongue portion having at its proximal and distal extremities detent receiving recesses, and having intermediate said recesses and in spaced relation thereto, a detent adapted to interlockingly coact with a detent receiving recess of a corresponding tongue of another beam when the webs of said beams are disposed in end-to-end relation, a tongue receiving pocket adjacent the proximal extremity of said tongue portion and having a cam portion struck out of the plane of said pocket, said cam portion adapted to deflect and guide said corresponding tongue portion of said another beam through its web and into overlapping and interlocking relation with its tongue portion.

4. A pair of beams in interlocked end-to-end relation, said beams each having a planar web portion, and at confronting extremities having dual purpose interlocking connecting means including:
  (a) in one of said pair of beams,
    (1) a tongue portion defined by spaced parallel marginal edges extending beyond the extremity of said web and integral therewith, and lying substantially in a plane superior to, and parallel to the plane of said web,
    (2) a tongue receiving pocket formed in said web adjacent the proximal extremity of said tongue portion, and lying substantially in a plane inferior to, and parallel to the plane of said web,
  (i) a cam portion of said pocket struck out of the plane of said pocket in a direction inferior to the plane of said pocket, and defining a tongue deflecting and guiding cam adapted to deflect the distal extremity of a mating tongue portion, and guide it through said web portion,
  (ii) a tab passing relief in said cam adapted to allow said distal tongue portion of said mating tongue portion to slide into said pocket, said passing relief lying substantially in a plane inferior to, and parallel to the plane of said tongue receiving pocket,
(3) a first detent recess, adjacent the distal extremity of said tongue portion, struck out of the plane of said tongue portion in a direction superior to the plane of said tongue portion, and forming a first tab extending in a direction superior to the plane of said tongue portion,
(4) a second detent recess, adjacent the proximal extremity of said tongue portion, similarly struck out of the plane of said tongue portion in a direction superior to the plane of said tongue portion, and forming a second tab extending in a direction superior to the plane of said tongue portion,
(5) a detent between said recesses, and in spaced relation thereto, said detent struck out of the plane of said tongue portion in a direction inferior to the plane of said tongue portion,
(6) a welt, between said second recess and said detent, and lying substantially in a plane superior to and parallel to the plane of said tongue portion,
(7) rolled reinforcing ribs adjacent each marginal edge of said tongue portion, extending from the proximal extremity of said tongue portion beyond said detent and short of said first detent recess, and lying substantially in a plane superior to and parallel to the plane of said tongue portion, (b) in the second of said pair of beams,
(1) a tongue portion defined by spaced parallel marginal edges extending beyond the extremity of said web and integral therewith and lying substantially in a plane inferior to and parallel to the plane of said web,
(2) a tongue receiving pocket formed in said web adjacent the proximal extremity of said tongue portion, and lying substantially in a plane superior to the plane of said web,
  (i) a cam portion of said pocket struck out of the plane of said pocket in a direction superior to the plane of said pocket, and defining a tongue deflecting and guiding cam adapted to deflect the distal extremity of a mating tongue portion, and guide it through said web portion,
  (ii) a tab passing relief in said cam portion adapted to allow said distal tongue portion of said mating tongue portion to slide into said pocket, said passing relief lying substantially in a plane superior to, and parallel to the plane of said tongue receiving pocket,
(3) a first detent recess, adjacent the distal extremity of said tongue portion, struck out of the plane of said tongue portion in a direction inferior to the plane of said tongue portion and forming a first tab extending in a direction inferior to the plane of said tongue portion,
(4) a second detent recess, adjacent the proximal extremity of said tongue portion, similarly struck out of the plane of said tongue portion in a direction inferior to the plane of said tongue portion, and forming a second tab extending in a direction inferior to the plane of said tongue portion,
(5) a detent between said recesses and in spaced relation thereto, said detent struck out of the plane of said tongue portion in a direction superior to the plane of said tongue portion,
(6) a welt, between said second recess and said detent, and lying substantially in a plane inferior to, and parallel to the plane of said tongue portion,
(7) rolled reinforcing ribs, adjacent each marginal edge of said tongue portion, extending from the proximal extremity of said tongue portion beyond said detent and short of said first detent recess, and lying substantially in a plane inferior to and parallel to the plane of said tongue portion.

5. In combination, a pair of beams interlocked in abutting end-to-end relation and means for interlocking said beams, the beams comprising:
  (a) aligned web portions;
  (b) opposing overlapped tongues extending beyond the webs and;
the means for interlocking said beams comprising:
  (c) at least one detent receiving recess in each tongue;
  (d) a detent on each tongue disposed in a corresponding recess in the opposing tongue; and
  (e) means at the proximal extremity of each tongue for engaging and guiding the opposed tongue into overlapped and interlocked relation.

6. The combination of claim 5, wherein the tongue engaging and guiding means (e) of each beam includes means for guiding the opposing tongue through its web at the proximal extremity of its tongue.

References Cited by the Examiner

UNITED STATES PATENTS 2,658,241   11/1953   Houghton et al.

FOREIGN PATENTS 620,469   5/1961   Canada.

FRANK L. ABBOTT, *Primary Examiner.*

RICHARD W. COOKE, Jr., *Examiner.*